(12) United States Patent
Hirao

(10) Patent No.: US 7,275,064 B2
(45) Date of Patent: Sep. 25, 2007

(54) APPARATUS FOR MANAGING VIRTUALIZED-INFORMATION

(75) Inventor: Tetsuhiro Hirao, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 10/781,757

(22) Filed: Feb. 20, 2004

(65) Prior Publication Data

US 2004/0225691 A1    Nov. 11, 2004

(30) Foreign Application Priority Data

May 7, 2003    (JP)    ............... 2003-128890

(51) Int. Cl.
- G06F 17/30    (2006.01)
- G06F 12/00    (2006.01)
- G06F 12/10    (2006.01)

(52) U.S. Cl. ............ 707/102; 707/200; 711/206
(58) Field of Classification Search ........ 709/213–224; 707/102, 200; 714/5; 711/206
See application file for complete search history.

(56) References Cited

U.S. PATENT DOCUMENTS

| | | |
|---|---|---|
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1* | 3/2002 | Reuter et al. ............... 711/206 |
| 2003/0229645 A1* | 12/2003 | Mogi et al. ................. 707/102 |
| 2004/0068561 A1* | 4/2004 | Yamamoto et al. ......... 709/224 |

FOREIGN PATENT DOCUMENTS

| | | | |
|---|---|---|---|
| EP | 1178407 | A | 2/2002 |
| JP | 2000-267937 | * | 9/2000 |
| JP | 2000-267937 | A | 9/2000 |
| JP | 2001-051890 | A | 2/2001 |
| JP | 2002-91706 | A | 3/2002 |
| JP | 2002099519 | A | 4/2002 |

* cited by examiner

Primary Examiner—Don Wong
Assistant Examiner—Hung Tran Vy
(74) Attorney, Agent, or Firm—Staas & Halsey LLP

(57) ABSTRACT

A virtualized-information management apparatus for managing corresponding information between real storage areas of a plurality of storages connected to a network and a virtual storage-area built by virtually integrating the real storage areas includes a transmission/reception unit that transmits/receives, between the virtualized-information management apparatus and another virtualized-information management apparatus connected to another network, information on updating the corresponding information, and an updating unit that updates the corresponding information based on the information received.

12 Claims, 8 Drawing Sheets

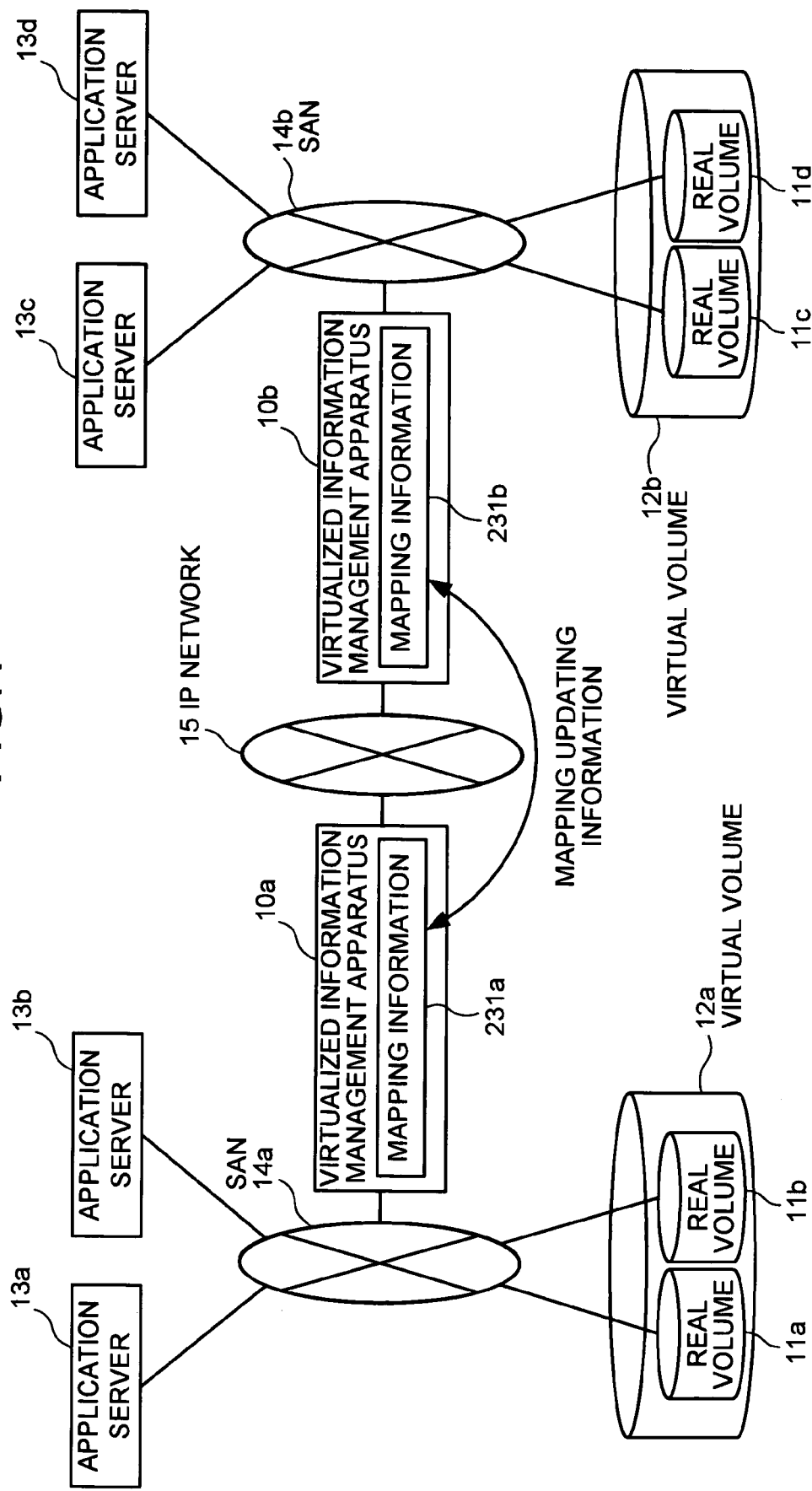

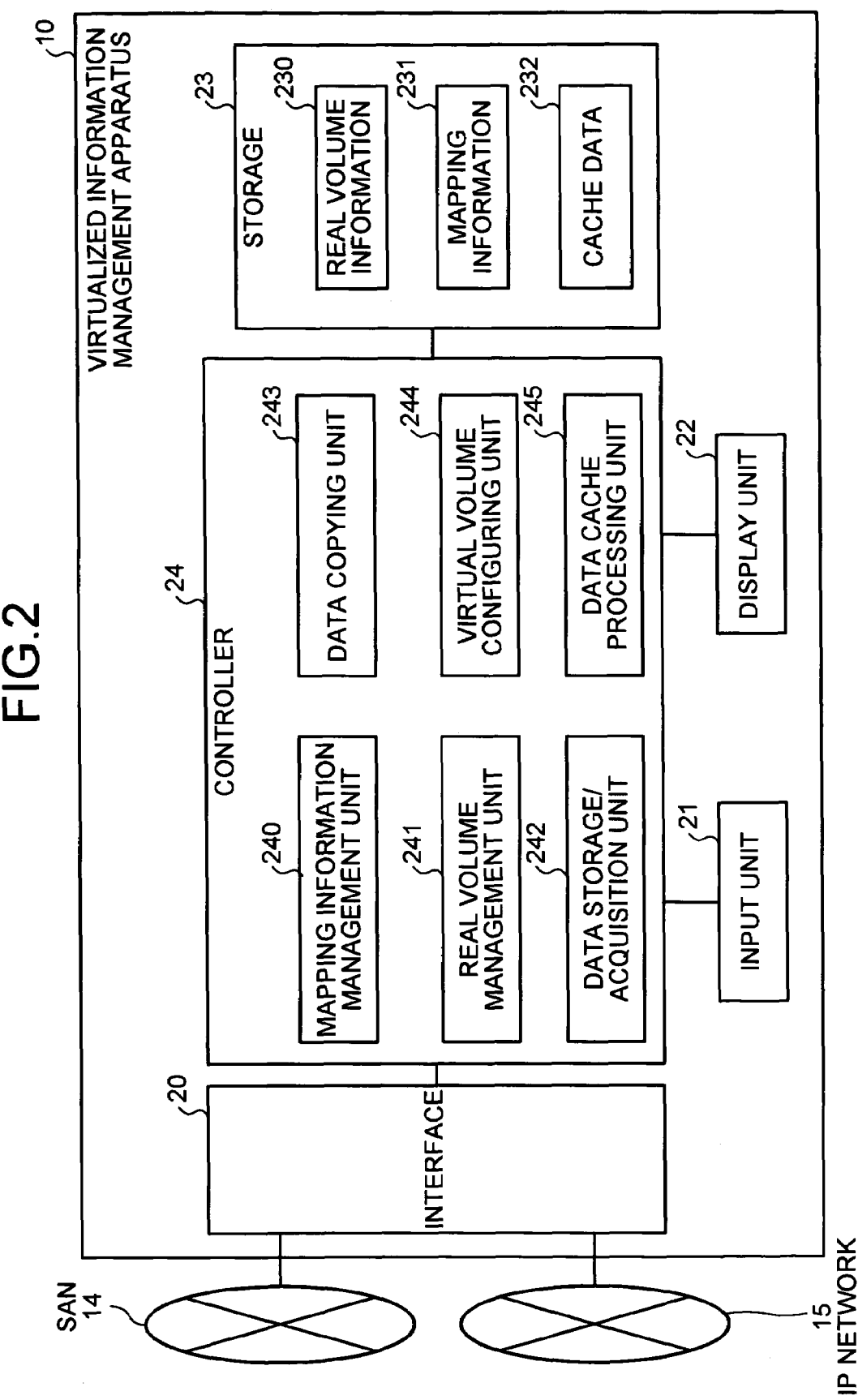

FIG.3A

REAL VOLUME IDENTIFYING INFORMATION

| NAME OF VIRTUAL VOLUME | FC ADDRESS OF STORAGE DEVICE | LUN | STORAGE CAPACITY OF REAL VOLUME |
|---|---|---|---|
| VOLUME A | 011300 | 0 | 60GB |
|  | ... | ... | ... |
|  | 021a00 | 3 | 120GB |
| VOLUME B | 051c00 | 8 | 50GB |
|  | ... | ... | ... |
|  | 061f00 | 10 | 300GB |
| ... | ... | ... | ... |

FIG.3B

REAL VOLUME FREE CAPACITY INFORMTION

| FC ADDRESS OF STORAGE DEVICE | TYPE OF REAL VOLUME | FREE CAPACITY OF REAL VOLUME |
|---|---|---|
| 011300 | HIGH-SPEED HDD | 40GB |
| 021a10 | HIGH-SPEED HDD | 30GB |
|  | LOW-SPEED HDD | 60GB |
| 051c00 | LOW-SPEED HDD | 50GB |
| 061f00 | TAPE DRIVE | — |
| ... | ... | ... |

FIG.4A

REAL VOLUME IDENTIFYING INFORMATION

| NAME OF COMMON VIRTUAL VOLUME | NAME OF VIRTUALIZED INFORMATION MANAGEMENT APPARATUS | IP ADDRESS OF VIRTUALIZED INFORMATION MANAGEMENT APPARATUS | NAME OF VIRTUAL VOLUME IN VIRTUALIZED INFORMATION MANAGEMENT APPARATUS | FREE CAPACITY OF VIRTUAL VOLUME |
|---|---|---|---|---|
| VOLUME 1 | APPARATUS A | 123.45.67.8 | VOLUME A | 150GB |
|  | APPARATUS A | 123.45.67.8 | VOLUME B | 300GB |
| VOLUME 2 | APPARATUS B | 98.76.54.32 | VOLUME C | 200GB |
| ... | ... | ... | ... | ... |

FIG.4B

VIRTUAL VOLUME SECTOR INFORMATION

| NAME OF COMMON VIRTUAL VOLUME | VIRTUAL VOLUME SECTOR | NAME OF VIRTUAL VOLUME IN VIRTUALIZED INFORMATION MANAGEMENT APPARATUS | FC ADDRESS OF STORAGE DEVICE | REAL VOLUME SECTOR |
|---|---|---|---|---|
| VOLUME 1 | 1~233,444 | VOLUME A | 021a00 | 1~233,444 |
|  |  | VOLUME B | 051c00 | 1~233,444 |
| VOLUME 2 | 1~362,891 | VOLUME C | 071900 | 1~362,891 |
| ... | ... | ... | ... | ... |

FIG.5
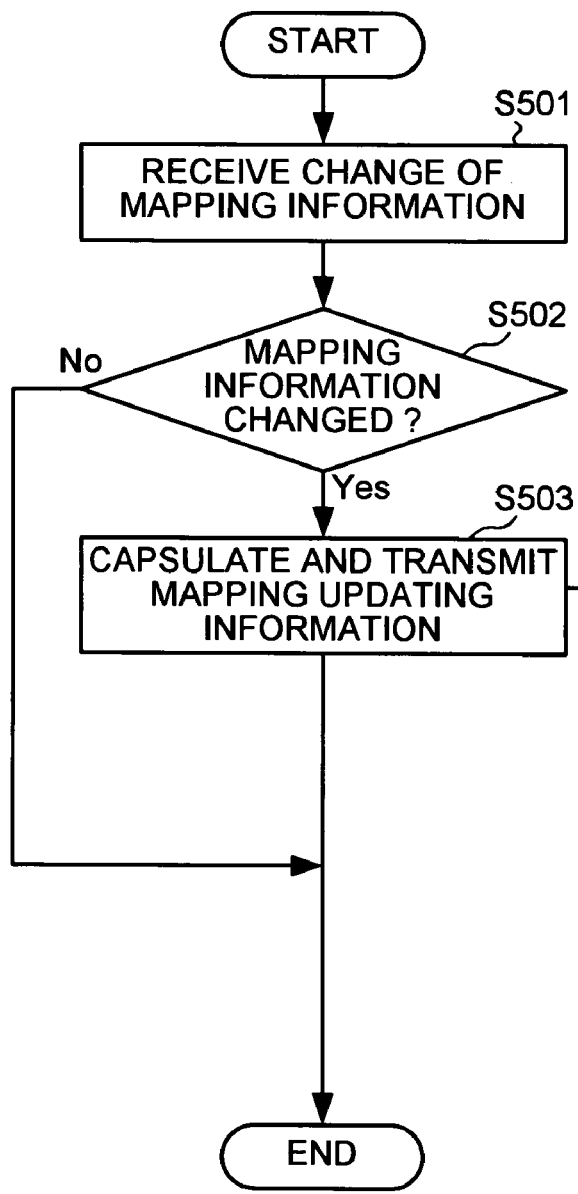
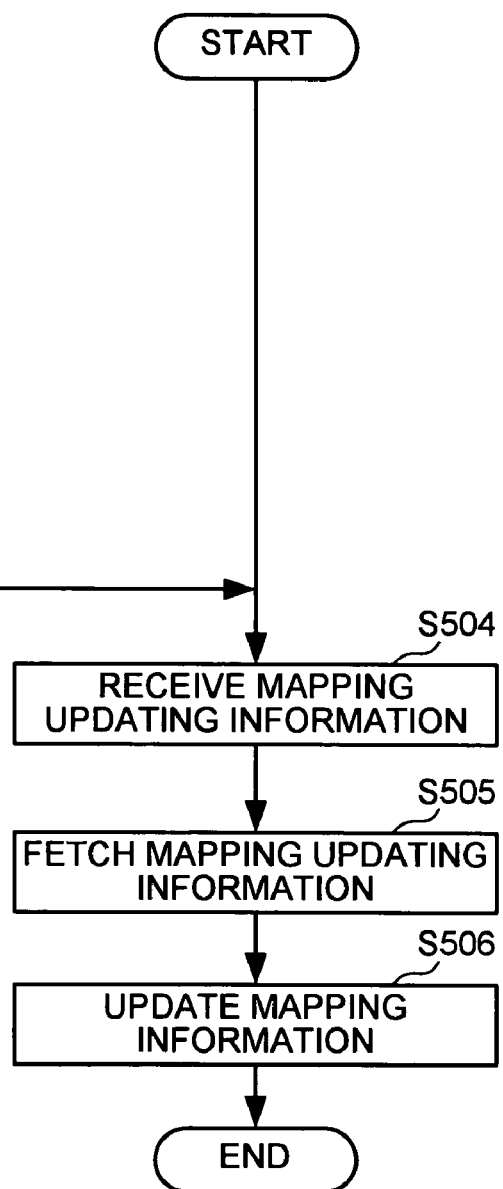

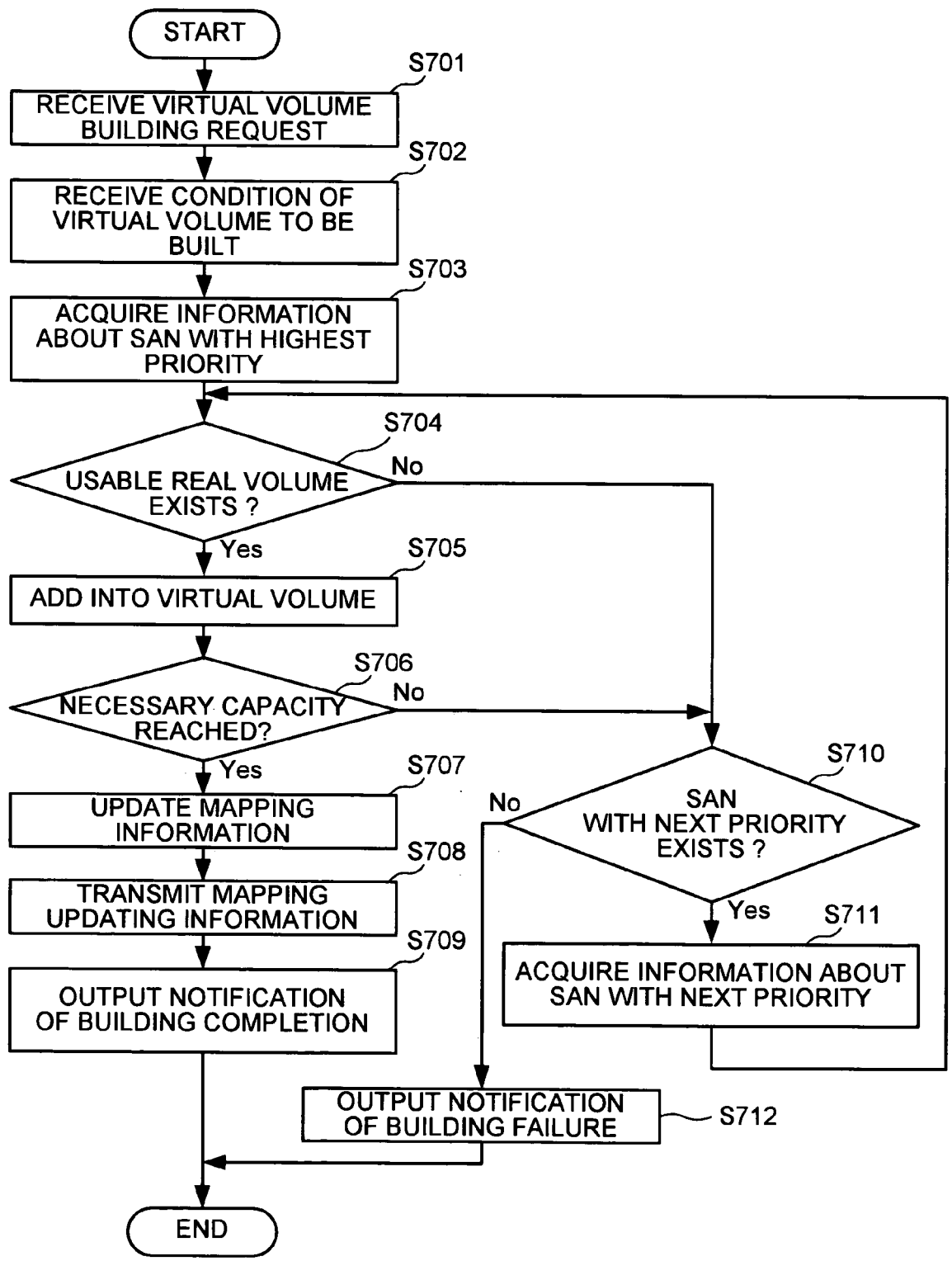

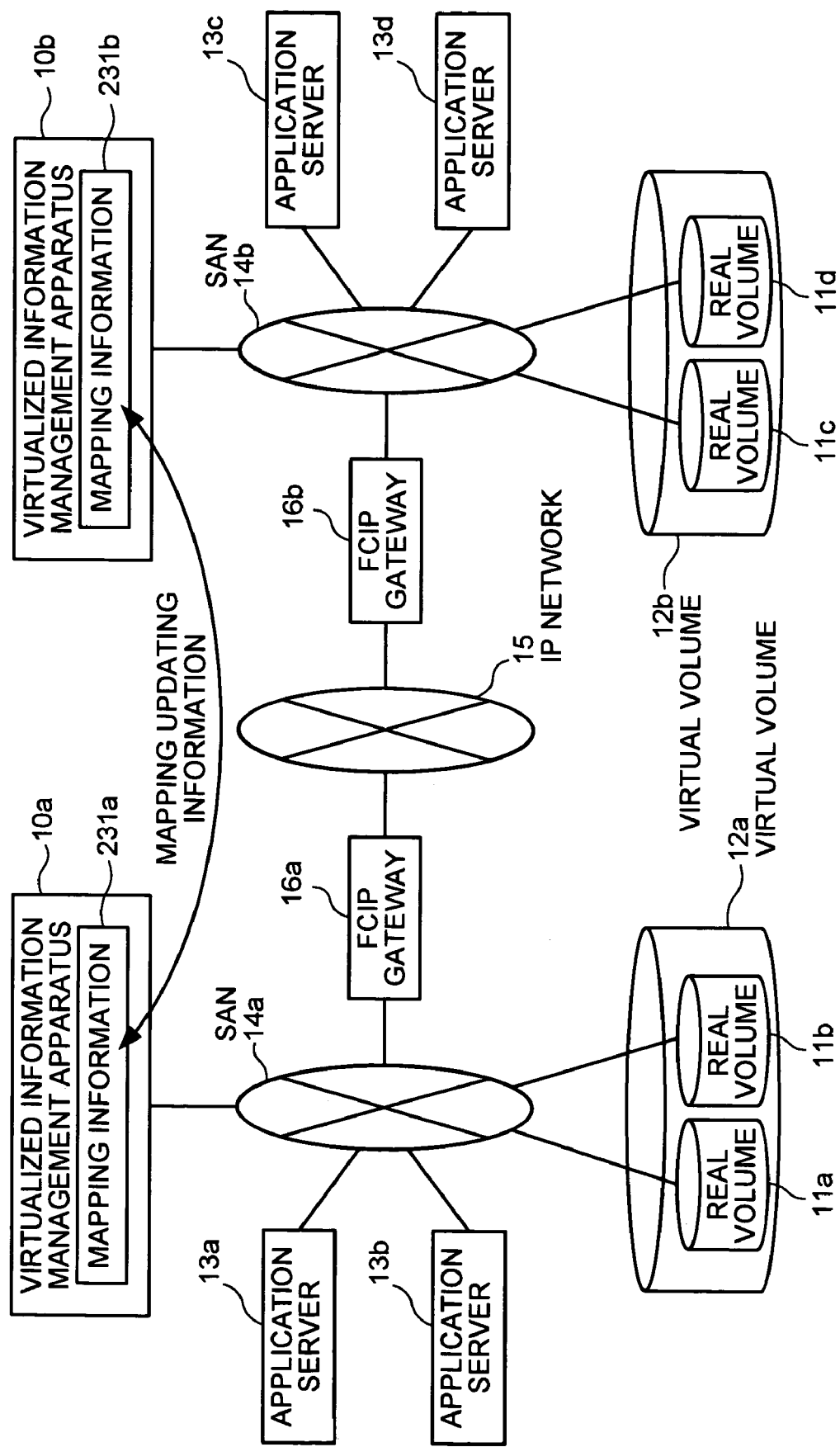

APPARATUS FOR MANAGING VIRTUALIZED-INFORMATION

BACKGROUND OF THE INVENTION

1) Field of the Invention

The present invention relates to a virtualized-information management apparatus that manages corresponding information between real volume(s) (real storage areas) of plural storages connected to a network and a virtual volume (virtual storage area) created by virtually integrating the real volume(s) (real storage areas), and that efficiently builds a virtualizing storage system with reliability.

2) Description of the Related Art

A technique of a storage area network (SAN) configured by connecting a plurality of storages such as a disk array drive and a tape drive via a network provides storage with large capacity to users. Recently, a virtualizing technique, where real volumes of the storages connected with the SAN are utilized as one virtual volume, has been applied to the SAN technique.

In such a virtualizing technique, mapping information between sectors of the real volumes of the storages and sectors of the virtual volume created virtually as one storage device is created, and the input/output (I/O) process is executed based on the mapping information.

The mapping information is stored in a management server connected with the SAN, and centrally managed by the management server. Therefore, when a malfunctioning occurs in the management server, access to data stored in the real volumes is impossible.

Japanese Patent Application Laid-Open No. 2002-91706 discloses a technique in which a plurality of mapping agents keep the mapping information in volatile memories, and a controller that manages the mapping information updates and backs up the mapping information held by the mapping agents.

In this system, even if a certain mapping agent malfunctions, the controller transmits correct mapping information to the mapping agent to recover it to a normal state.

However, since the controller centrally manages the mapping information held in the mapping agents, when any abnormality occurs in the controller itself, the mapping information cannot be properly managed.

Particularly, when an IP-SAN, which is a network where a plurality of SANs are connected via an Internet protocol (IP) network, is built, if a failure occurs in the controller, this affects management of all the SANs.

Even if the controller has no failure, when a failure occurs in the network that connects the controller, transmission/reception of data between the controller and the mapping agents cannot be executed. For this reason, the mapping information in all the mapping agents cannot be managed.

SUMMARY OF THE INVENTION

It is an object of the present invention to solve at least the problems in the conventional technology.

The virtualized-information management apparatus for managing corresponding information between real storage areas of a plurality of storages connected to a network and a virtual storage area built by virtually integrating the real storage areas, according to one aspect of the present invention includes a transmission/reception unit that transmits/receives, between the virtualized-information management apparatus and another virtualized-information management apparatus connected to another network, information on updating the corresponding information, and an updating unit that updates the corresponding information based on the information received.

The method of managing corresponding information between real storage areas of a plurality of storages connected to a network and a virtual storage area built by virtually integrating the real storage areas in a virtualized-information management apparatus connected to the network, according to another aspect of the present invention includes transmitting information on updating the corresponding information to another virtualized-information management apparatus connected to another network, receiving the information on updating the corresponding information from the another virtualized-information management apparatus, and updating the corresponding information based on the information received.

The computer program for managing corresponding information between real storage areas of a plurality of storages connected to a network and a virtual storage area built by virtually integrating the real storage areas in a virtualized-information management apparatus connected to the network, according to still another aspect of the present invention makes a computer executes the method according to the present invention.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 1 is a schematic diagram of a virtualizing storage system according to an embodiment of the present invention;

FIG. 2 is a block diagram of a virtualized-information management apparatus 10 shown in FIG. 1;

FIG. 3A and FIG. 3B are tables of an example of a data configuration of real volume information 230 shown in FIG. 2;

FIG. 4A and FIG. 4B are tables of an example of a data configuration of mapping information 231 shown in FIG. 2;

FIG. 5 is a flowchart of a mapping-information updating procedure by a mapping information management unit 240;

FIG. 7 is a flowchart of a virtual-volume building procedure by a virtual volume building unit 244; and FIG. 8 is a schematic diagram of a virtualizing storage system when fiber channel internet protocol (FCIP) gateways 16a and 16b execute an encapsulating process.

DETAILED DESCRIPTION

Figure 6:
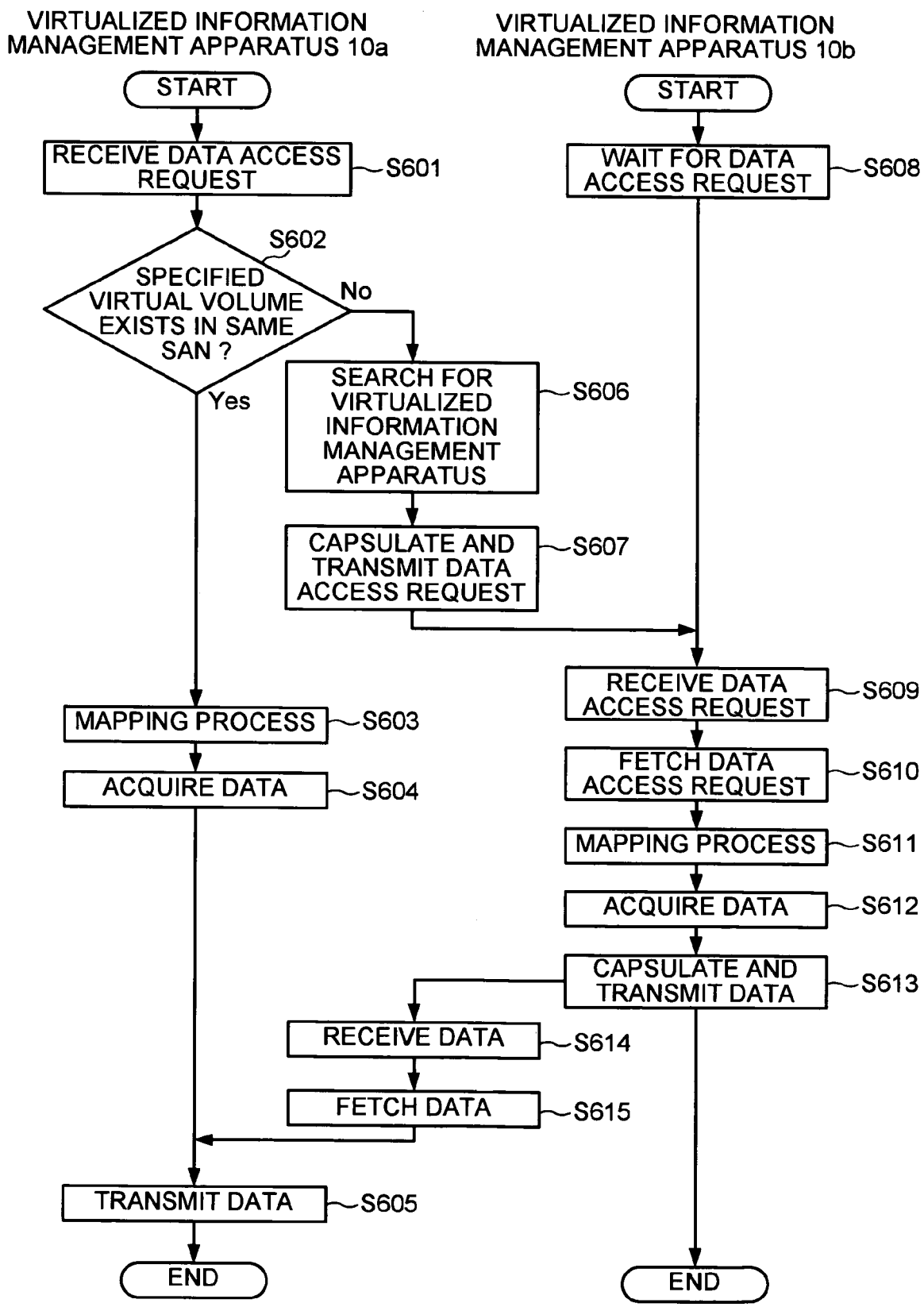
FIG. 6 is a flowchart of a data acquisition procedure by a data storage/acquisition unit 242.

Exemplary embodiment of a method of and an apparatus for managing virtualized-information according to the present invention are explained in detail with reference to the accompanying drawings. The embodiment explains a fiber channel-storage area network (FC-SAN) in which a storage on each SAN transmits/receives data according to an FC protocol.

FIG. 1 is a schematic diagram of a virtualizing storage system according to an embodiment of the present invention.

The SAN 14a and the SAN 14b are connected via an IP network 15. A virtualized-information management apparatus 10a intervenes between the SAN 14a and the IP network 15, and a virtualized-information management apparatus 10b intervenes between the SAN 14b and the IP network 15.

The SAN 14a is configured by connecting a plurality of FC switches, not shown, with the virtualized-information management apparatus 10a, real volumes 11a and 11b, and application servers 13a and 13b. The real volumes 11a and 11b are virtualized so as to configure one virtual volume 12a.

Similarly, the SAN 14b is configured by connecting a plurality of FC switches, not shown, with the virtualized-information management apparatus 10b, real volumes 11c and 11d, and application servers 13c and 13d. The real volumes 11c and 11d are virtualized so as to configure one virtual volume 12b.

The virtualized-information management apparatuses 10a and 10b manage mapping information (corresponding information) between sectors of the real volumes 11a to 11d and sectors of the virtual volumes 12a and 12b. The mapping information includes a relationship between the sectors of the real volumes (real storage areas) and the sectors of the virtual volumes (virtual storage areas), and information for specifying virtualized-information management apparatuses that manage the virtual volumes.

The virtualized-information management apparatus 10a has mapping information 231a, and the mapping information 231a holds not only the mapping information about the virtual volume 12a belonging to the SAN 14a connected with the virtualized-information management apparatus 10a but also the mapping information about the virtual volume 12b belonging to another SAN 14b.

The virtualized-information management apparatus 10b has mapping information 231b, and the mapping information 231b holds not only the mapping information about the virtual volume 12b belonging to the SAN 14b connected with the virtualized-information management apparatus 10b but also the mapping information about the virtual volume 12a belonging to another SAN 14a.

When the application server 13a or 13b accesses to the virtual volume 12b, it makes an access request to the virtualized-information management apparatus 10a. The virtualized-information management apparatus 10a refers to the mapping information 231a, and checks to find on which virtualized-information management apparatus on the SAN the virtual volume 12b is managed.

When the virtualized-information management apparatus 10b that manages the virtual volume 12b is specified, the virtualized-information management apparatus 10a transmits the access request to the specified virtualized-information management apparatus 10b. The virtualized-information management apparatus 10b which receives the access request accesses to the virtual volume 12b managed by the apparatus 10b, and transmits the result to the application server 13a or 13b via the virtualized-information management apparatus 10a.

Similarly, when the application server 13c or 13d accesses to the virtual volume 12a, an access request is sent to the virtualized-information management apparatus 10b. The virtualized-information management apparatus 10b refers to the mapping information 231b, and checks to find on which virtualized-information management apparatus on the SAN the virtual volume 12a is managed.

When the virtualized-information management apparatus 10a that manages the virtual volume 12a is specified, the virtualized-information management apparatus 10b transmits the access request to the specified virtualized-information management apparatus 10a. The virtualized-information management apparatus 10a which receives the access request accesses to the virtual volume 12a managed by the apparatus 10a, and transmits the result to the application server 13c or 13d via the virtualized-information management apparatus 10b.

When a new virtual volume is created on the SAN 14b managed by the virtualized-information management apparatus 10b, the virtualized-information management apparatus 10a receives updated information relating to the mapping information 231b of the virtualized-information management apparatus 10b, and updates its mapping information 231a based on the mapping information 231b.

Similarly, when a new virtual volume is created on the SAN 14a managed by the virtualized-information management apparatus 10a, the virtualized-information management apparatus 10b receives updated information relating to the mapping information 231a of the virtualized-information management apparatus 10a, and updates its mapping information 231b based on the mapping information 231a.

The mapping information 231a of the virtualized-information management apparatus 10a and the mapping information 231b of the virtualized-information management apparatus 10b can have common mapping information. Even when a new virtual volume is created on another SAN, its information can be reflected on the mapping information 231a or 231b, so that the newly created virtual volume can be utilized.

In this case, even when abnormality occurs in the virtualized-information management apparatus 10a and thus it cannot refer to the mapping information 231a, the application servers 13c and 13d refer to the mapping information 231b, so as to be able to access to the virtual volume 12b regardless of the abnormality of the virtualized-information management apparatus 10a.

On the contrary, when abnormality occurs in the virtualized-information management apparatus 10b and thus it cannot refer to the mapping information 231b, the application servers 13a and 13b refer to the mapping information 231a, so as to be able to access to the virtual volume 12a regardless of the abnormality of the virtualized-information management apparatus 10b.

Differently from the conventional art in which the mapping information is integrally managed, the virtualized-information management apparatuses 10a and 10b hold the common mapping information 231a and 231b in a dispersed manner so that the virtualizing storage system having high reliability can be configured in an FC-SAN where the two SANs 14a and 14b are connected by the IP network 15.

The case where two SANs 14a and 14b are connected by the IP network 15 is explained, but its number is not limited to two and two or more SANs may be connected by the IP network 15.

FIG. 2 is a block diagram of a virtualized-information management apparatus 10 shown in FIG. 1. The virtualized-information management apparatus 10 is connected with the SAN 14 and the IP network 15.

The virtualized-information management apparatus 10 according to the present invention refers to the mapping information (corresponding information), so as to execute a mapping process or the like for specifying a sector of a real volume based on a sector of the specified virtual volume when the application servers 13a to 13d connected with the SANs 14a and 14b write or read data into/from the virtual volume 12a or 12b.

The virtualized-information management apparatus 10 transmits/receives updated information of the mapping information 231 to/from another virtualized-information management apparatus 10 connected with another SAN 14, so as to hold the common mapping information 231.

The virtualized-information management apparatus 10 has an interface unit 20, an input unit 21, a display unit 22, a storage unit 23 and a control unit 24. The interface unit 20 is a network interface that transmits/receives data to/from the application servers 13a to 13d and the virtualized-information management apparatus 10 connected with another SAN 14 via the SAN 14 or the IP network 15.

The input unit 21 is an input device such as a keyboard and a mouse, and the display unit 22 is a display device such as a display. The storage unit 23 is storage such as a hard disk device. The storage unit 23 has real volume information 230, mapping information 231, and cache data 232.

The real volume information 230 includes information about real volumes present in the SAN 14 connected with the virtualized-information management apparatus 10. FIG. 3A and FIG. 3B are tables of an example of a data configuration of real volume information 230 shown in FIG. 2. The real volume information 230 includes real volume identifying information illustrated in FIG. 3A, and real volume free capacity information illustrated in FIG. 3B.

The real volume identifying information illustrated in FIG. 3A has items for name of virtual volume, FC address of storage, logical unit number (LUN), and real volume storage capacity. The name of the virtual volume includes identifying names given to the virtual volumes on the SANs 14 managed respectively by the virtualized-information management apparatus 10.

The FC address of the storage includes FC addresses of the storages having the real volumes configuring the virtual volume. The FC addresses are managed by FC switches, and the respective storages can be integrally identified by the FC addresses. The LUN includes logical unit numbers for identifying the real volumes. Each virtual volume includes a plurality of logical volumes. The real volume storage capacity is a storage capacity with which the real volumes can store data therein.

The real volume free capacity information illustrated in FIG. 3B has items for FC address of storage, type of real volume, and real volume free capacity. The FC address of real volume corresponds to the FC address of real volume illustrated in FIG. 3A.

The type of real volume includes types of the storages configuring the real volumes, and includes proprieties of the storages such as a high-speed hard disk drive (HDD), a low-speed HDD, and a tape drive. The real volume free capacity is information including free capacities of the real volumes. When the FC address of storage is "021a00", types of two real volumes "high-speed HDD" and "low-speed HDD" are related with this device. This represents that this device is configured by two kinds of HDDs.

Referring back to FIG. 2, the mapping information 231 includes the mapping information between the logical sectors of the virtual volumes and the real sectors of the real volumes and the information about the virtualized-information management apparatus 10 that manages the virtual volumes. The updated information of the mapping information 231 is transmitted/received to/from the virtualized-information management apparatus 10 connected with another SAN 14, so that the virtualized-information management apparatuses 10 hold the common mapping information 231.

FIG. 4A and FIG. 4B are tables of an example of a data configuration of a mapping information 231 shown in FIG. 2. The mapping information 231 has virtual volume identifying information illustrated in FIG. 4A and virtual volume sector information illustrated in FIG. 4B.

The virtual volume identifying information illustrated in FIG. 4A has items for name of common virtual volume, name of virtualized-information management apparatus, IP addresses of virtualized-information management apparatus, name of virtual volume in virtualized-information management apparatus, and a free capacity of virtual volume.

The name of common virtual volume includes identifying names which are commonly used and can integrally identify the virtual volumes in any virtualized-information management apparatus 10 connected with any SAN 14. The name of virtualized-information management apparatus includes identifying names for identifying the virtualized-information management apparatus 10 which is connected with the SAN 14 where the virtual volume is present and manages the mapping information 231. The IP address of virtualized-information management apparatus includes IP addresses of the virtualized-information management apparatuses 10 identified by the names of the virtualized-information management apparatuses.

The name of virtual volume in virtualized-information management apparatus includes identifying names for the virtual volumes corresponding to the names of the virtual volumes illustrated in FIG. 3A. These identifying names are available only for the virtualized-information management apparatus 10 which stores the real volume information 230 illustrated in FIGS. 3A and 3B. The virtual volume free capacity is information which includes the free capacity of the virtual volumes identified by the names of the common virtual volume.

In the example of FIG. 4A, two names of virtualized-information management apparatuses, two IP addresses of the virtualized-information management apparatuses, two names of the virtual volumes in the virtualized-information management apparatuses, and two free capacities of the virtual volume, are present in the virtual volume where the name of the common virtual volume is volume 1.

This is because in order to balance a load on the real volume, the data stored in a real volume corresponding to "volume A" are copied in a real volume corresponding to "volume B". The data are copied between the volumes in such a manner, so that an access destination can be switched according to the load of the access on a volume.

The virtual volume sector information illustrated in FIG. 4B has items for name of common virtual volume, virtual volume sector, name of virtual volume in virtualized-information management apparatus, FC address of storage, and real volume sector. The name of common virtual volume corresponds to the name of common virtual volume illustrated in FIG. 3A, and the virtual volume sector is a sector of a virtual volume identified by the name of the common virtual volume.

The name of virtual volume in the virtualized-information management apparatus corresponds to the name of the virtual volume in the virtualized-information management apparatus illustrated in FIG. 4A. The FC address of the storage corresponds to the FC address of storage illustrated in FIG. 3A. The real volume sector is a sector of the real volume mapped in the virtual volume sector.

For the name of the common virtual volume and the virtual volume sector, two names of the virtual volumes in the virtualized-information management apparatuses, two FC addresses of the storages, and two real volume sectors are present. This is because data stored in the real volume corresponding to "volume A" are copied into the real volume corresponding to "volume B" to balance the load on the real volume.

When data are read, specifying of the name of the common virtual volume into which the data are stored and the virtual volume sector is accepted. "Volume 1" is specified as the name of the common virtual volume, and "1 to 1,500" is specified as the virtual volume sector here.

In this case, the virtual volume sector information in FIG. 4B is referred to, and the name of the virtual volume in the virtualized-information management apparatus has two kinds of names "volume A" and "volume B". When the load of the access to the real volumes configuring "volume A" is large, "volume B" is a virtual volume which is accessed instead.

When "volume 1" and "1 to 1,500" are specified as the access destination of data, "volume A" as a copy source is set as an access destination. The name of the virtualized-information management apparatus that manages "volume A" and the IP address of the virtualized-information management apparatus are acquired from the virtual volume identifying information illustrated in FIG. 4A. As a result, it is specified which virtualized-information management apparatus 10 manages "volume A".

It is found from the virtual volume sector information in FIG. 4B that the FC address of the storage having the sector corresponding to the virtual volume sector "1 to 1,500" is "021a00". This is because a range of the specified sector is included in the virtual volume sector "1 to 233,444". Further, the real volume sector corresponding to the virtual volume sector "1 to 1,500" is a sector of the storage "1 to 1,500" where the FC address is "021a00". The sector range of the real volume of the storage where the FC address is "021a00" is "1 to 233,444", and this corresponds to the sector of the virtual volume of "volume 1".

When the name of the common virtual volume "volume 1" and the virtual volume sector "1 to 1,500" are specified as the access destination of data, the real volume sector of a storage storing the data actually and the virtualized-information management apparatus 10 that manages the real volume of the storage as a virtual volume can be specified. For this reason, the data stored in the real volume sector can be accessed.

As a result of requesting the specified virtualized-information management apparatus 10 for data access, when an access destination changing request is received from the virtualized-information management apparatus 10 due to increase in real volume load, the similar information process is executed on "volume B" where the data of "volume A" are copied. A request is made to the specified virtualized-information management apparatus 10 for data access.

The case of reading data is explained above, but when data are stored into a virtual volume, the similar process is executed so that the virtualized-information management apparatus 10 that manages sectors of corresponding real volumes and a virtual volume configured by the real volumes can be specified. As a result, the data can be stored.

Referring back to FIG. 2, the cache data 232 include data read from the virtual volume by the virtualized-information management apparatus 10. When the virtualized-information management apparatus 10 reads the same data again, it reads the stored data so that the load of the data reading can be reduced.

The control unit 24 totally controls the virtualized-information management apparatus 10, and has a mapping information management unit 240, a real volume management unit 241, a data storage/acquisition unit 242, a data copying unit 243, a virtual volume building unit 244, and a data cache processing unit 245.

The mapping information management unit 240 manages the mapping information 231 in such a manner that it updates the mapping information 231 stored in the storage unit 23 (corresponding information updating unit) based on the updated information of the mapping information 231 received from another virtualized-information management apparatus 10 connected with another SAN 14.

Further, the mapping information management unit 240 transmits/receives the updated information of the mapping information 231 to/from another virtualized-information management apparatus 10 connected with another SAN 14 via the IP network 15 (updated information transmission/reception unit). At this time, the updated information of the mapping information 231 is encapsulated with a packet of the IP protocol so as to be transmitted.

When the mapping information management unit 240 receives the updated information from the mapping information 231 encapsulated with the packet of the IP protocol and transmitted from the virtualized-information management apparatus 10, it executes a decapsulating process, so as to fetch the updated information of the mapping information 231.

When a new virtual volume is configured, the mapping information management unit 240 adds the information about it to the mapping information 231. When the mapping information management unit 240 accepts a request for deleting a virtual volume, it deletes information about the virtual volume.

When data of the virtual volume to be deleted are saved, the data copying unit 243 copies the data into another virtual volume before the virtual volume is deleted.

When the mapping information 231 is updated in such a manner, the updated information is transmitted to another virtualized-information management apparatus 10 connected to another SAN 14, so that the mapping information 231 is shared.

When the request for accessing to the virtual volume is accepted during updating of the mapping information 231, the request is held until the updating is completed, and the access request may be processed after the completion.

The real volume management unit 241 manages the real volume information 230 stored in the storage unit 23. Concretely, when a new real volume is added, the real volume management unit 241 stores the information about the real volume into the real volume information 230, and when the real volume is excluded, it deletes the information about the real volume.

The data storage/acquisition unit 242 accepts a data storage request or a data acquisition request with respect to a virtual volume from the application server or another virtualized-information management apparatus 10 connected with another SAN 14, and it stores data into a real volume corresponding to the virtual volume or acquires data from the real volume.

When the data storage/acquisition unit 242 accepts a request from the application server, it acquires a name of the virtualized-information management apparatus corresponding to the name of the common virtual volume, an IP address of the virtualized-information management apparatus, and a name of the virtual volume in the virtualized-information management apparatus from the virtual volume identifying information illustrated in FIG. 4A based on the information about the name of the specified common virtual volume and the sector of the virtual volume (management apparatus searching unit).

When the specified virtualized-information management apparatus 10 is a self apparatus, the data storage/acquisition unit 242 acquires information about the FC address of the storage and the sector of the real volume related with the name of the common virtual volume from the virtual volume sector information illustrated in FIG. 4B. The data storage/acquisition unit 242 specifies the sector of the real volume mapped in the sector of the specified virtual volume, and stores or acquires data into/from the sector of the real volume.

Further, when the specified virtualized-information management apparatus 10 is another apparatus 10 on another SAN 14, the data storage/acquisition unit 242 transmits the data storage request or the data acquisition request to the virtualized-information management apparatus 10.

When the data storage/acquisition unit 242 accepts the data storage or acquisition request from another virtualized-information management apparatus 10 connected with another SAN 14, it acquires the information about the name of the common virtual volume and the sector of the virtual volume from the virtualized-information management apparatus 10. The data storage/acquisition unit 242 acquires the information about the FC address of the storage and the real volume sector related with the name of the common virtual volume from the virtual volume sector information illustrated in FIG. 4B.

The data storage/acquisition unit 242 specifies the sector of the real volume mapped in the sector of the specified virtual volume, and stores or acquires data into/from the sector of the real volume. When the data acquisition process is executed, the acquired data are transmitted to the virtualized-information management apparatus 10 to which the data acquisition request is transmitted (data storage/acquisition unit).

When data are transmitted to another virtualized-information management apparatus 10 connected with another SAN 14 via the IP network 15, the data storage/acquisition unit 242 encapsulates the data with the packet of the IP protocol so as to transmit them. When the data storage/acquisition unit 242 receives the data which are encapsulated with the packet of the IP protocol and transmitted from the virtualized-information management apparatus 10 connected with another SAN 14, it executes the decapsulating process so as to fetch the data.

Further, when the data copying unit 243, mentioned later, copies the data stored in the real volume corresponding to the virtual volume into the real volume corresponding to another virtual volume in order to balance the access load on the real volume, the data storage/acquisition unit 242 monitors the load on the real volume corresponding to the virtual volume as a copy source. When the load exceeds a predetermined quantity, the real volume corresponding to the virtual volume as the copy source of the data is specified based on the mapping information 231, and the access destination is switched into the real volume.

The data copying unit 243 copies the data stored in the real volumes configuring the virtual volume into the real volumes configuring another virtual volume (data copying unit). The data may be copied into the real volumes on another SAN.

The data are copied by using a known technique for duplicating a volume or a known technique for copying data between the SANs. After the copying, as illustrated in the examples of FIGS. 4A and 4B, a request is made to the mapping information management unit 240 for updating the virtual volume identifying information and the virtual volume sector information in the mapping information 231.

A request is made so as to add information about the name of the virtualized-information management apparatus, the IP address of the virtualized-information management apparatus, the name of the virtual volume in the virtualized-information management apparatus, and virtual volume free capacity as the information about the volume in the copying destination of the data to the virtual volume identifying information. Further, a request is made so as to add information about the name of the virtual volume in the virtualized-information management apparatus, the FC address of the storage, and the real volume sector as the information about the volume in the copying destination of the data into the virtual volume sector information.

The virtual volume building unit 244 configures a new virtual volume (virtual storage area configuring unit). When a virtual volume is configured, the virtual volume building unit 244 accepts specifying of condition of properties and a capacity which are satisfied by the virtual volume to be configured. The virtual volume building unit 224 refers to the type of the real volume and the free capacity of the real volume illustrated in FIG. 3B so as to configure the virtual volume which satisfies the conditions.

The cache processing unit 245 caches data read from the virtual volume by the virtualized-information management apparatus 10 as the cache data 232 into the storage unit 23. When the same data are read again, the cache processing unit 245 caches the data cached as the cache data 232 to be read from the storage unit 23 (data cache unit).

The data to be cached may be data acquired from another virtualized-information management apparatus 10 connected with another SAN 14 via the IP network 15. As a result, the load of data transmission/reception via the IP network 15 can be reduced.

FIG. 5 is a flowchart of a mapping-information updating procedure by a mapping information management unit 240. When a virtual volume is configured on the SAN 14a connected with the virtualized-information management apparatus 10a, the virtualized-information management apparatus 10a accepts a change of the stored mapping information 231a (step S501). The virtualized-information management apparatus 10a checks whether the mapping information 231a is changed (step S502), and when there is no change (No at step S502), the process is ended.

When the mapping information 231a is changed (Yes at step S502), mapping updating information for updating the mapping information 231a is transmitted to another virtualized-information management apparatus 10b on another SAN 14b (step S503). Since the updated information is transmitted via the IP network, it is encapsulated with the IP protocol so as to be transmitted. As for the updated information to be transmitted, the entire mapping information 231a may be transmitted, or only a changed portion may be transmitted.

On the other hand, the virtualized-information management apparatus 10b on another SAN 14b receives the mapping updating information encapsulated with the IP protocol (step S504). The virtualized-information management apparatus 10b fetches the mapping updating information (step S505), and updates the mapping information 231b therein based on the mapping updating information.

When the mapping information 231a in the virtualized-information management apparatus 10a is changed, the mapping updating information is transmitted to the virtualized-information management apparatus 10b on another SAN 14b. In order to check whether the respective virtualized-information management apparatuses 10 on another SANs 14 operate, however, a part of the information stored into the mapping information 231 periodically (for example, the name of the virtualized-information management apparatus or the like) is transmitted/received between the virtualized information management apparatuses so that the check may be made.

This method is used also when a new SAN and a virtualized-information management apparatus on that SAN are added. Further, when a failure occurs in the IP network 15, the mapping information may be put together in one virtualized-information management apparatus by this method so as to be distributed.

FIG. 6 is a flowchart of a data acquisition procedure by a data storage/acquisition unit 242. The virtualized-information management apparatus 10a accepts a request for accessing to data stored in the virtual volume from the application server 13a or 13b (step S601). The name of common virtual volume and the virtual volume sector illustrated in FIG. 4B are supposed to be specified here.

A check is made based on the name of the specified common virtual volume whether the specified virtual volume is present in one SAN 14 with reference to the mapping information 231 (step S602).

When the specified virtual volume is present (Yes at step S602), the mapping process for specifying a sector of a real volume into which the data to be accessed are stored is executed (step S603), so that the data are acquired from the sector of the real volume (step S604). Thereafter, the acquired data are transmitted to the application server 13a or 13b which accepts the data access request (step S605).

When the specified virtual volume is not present in one SAN 14a at step S602 (No at step S602), the virtualized-information management apparatus 10b that manages the virtual volume is searched from the virtual volume identifying information in the mapping information 231 illustrated in FIG. 4A (step S606).

When the virtualized-information management apparatus 10b which manages the virtual volume is specified, the data access request is transmitted to the virtualized-information management apparatus 10b (step S607). In this case, since the data access request is transmitted via the IP network, the data access request is encapsulated with the IP protocol so as to be transmitted.

The virtualized-information management apparatus 10b connected with another SAN 14b waits for the data access request similarly to the virtualized-information management apparatus 10a (step S608). When the virtualized-information management apparatus 10b receives the data access request encapsulated with the IP protocol from the virtualized-information management apparatus 10a (step S609), it deactivates the encapsulation so as to fetch the data access request (step S610).

Thereafter, the virtualized-information management apparatus 10b executes the mapping process for specifying the sector of the real volume where the data to be accessed are stored with reference to the mapping information 231b in the virtualized-information management apparatus 10b (step S611). The virtualized-information management apparatus 10b acquires data from the sector of the real volume (step S612). When acquiring the data, virtualized-information management apparatus 10b encapsulates the data with the IP protocol so as to transmit them to the virtualized-information management apparatus 10a which has transmitted the data access request (step S613).

The virtualized-information management apparatus 10a receives the data encapsulated and transmitted by the virtualized-information management apparatus 10b (step S614), and deactivates the encapsulation so as to fetch the data (step S615). Thereafter, the sequence proceeds to step S605, and the virtualized-information management apparatus 10a transmits the fetched data to the application server 13a or 13b which has accepted the data access request.

FIG. 7 is a flowchart of a virtual-volume building procedure by a virtual volume building unit 244. The virtual volume building unit 244 accepts a virtual volume building request (step S701), and accepts specifying of a condition of the virtual volume to be configured (step S702). The condition of the virtual volume includes a type of a real volume configuring the virtual volume and a necessary capacity of the virtual volume. The type of the real volume is included as the type of the real volume in the real volume free capacity information illustrated in FIG. 3B.

The virtual volume building unit 244 acquires the real volume information 230 of the SAN 14 where a predetermined priority sequence is the first from the SANs 14 which are used for configuring the virtual volume (step S703). The SAN 14 whose priority sequence is the first is normally the SAN 14 connected with the virtualized-information management apparatus 10 that executes the configuring process.

The virtual volume building unit 244 checks whether a real volume which can be used for configuring the virtual volume is present based on the condition accepted at step S702 and the type of the real volume and the real volume free capacity included in the real volume information 230 (step S704).

When the usable real volume is present (Yes at step S704), the virtual volume building unit 244 adds the real volume to the virtual volume (step S705), and checks whether the capacity reaches the necessary capacity specified at step S702 (step S706).

When the capacity reaches the necessary capacity (Yes at step S706), the virtual volume building unit 244 updates the mapping information 231 (step S707), and requests the mapping information management unit 240 in the virtualized-information management apparatus 10 connected with another SAN 14 to transmit the mapping updating information (step S708). Thereafter, the virtual volume building unit 244 outputs a notification that configuring of the virtual volume is completed so as to notify it to an administrator or the like who has made the configuring request.

When no usable real volume is present on the SAN 14 whose priority sequence is the first at step S704 (No at step S704), the virtual volume building unit 244 checks whether the SAN 14 whose priority sequence is the second highest is present (step S710).

When the SAN 14 whose priority sequence is the second highest is present (Yes at step S710), the virtual volume building unit 244 acquires the real volume information 230 about that SAN 14 (step S711). The sequence proceeds to step S704, so that the virtual volume building unit 244 checks whether a usable real volume is present on the SAN 14.

When the SAN 14 whose priority sequence is the second highest is not present (No at step S710), the virtual volume building unit 244 outputs a notification that the virtual volume configuration is failed so as to notify it to the administrator or the like who has made the configuration request (step S712).

In the this embodiment, the updated information of the mapping information 231 is transmitted/received between the self-virtualized-information management apparatus 10 and another virtualized-information management apparatus 10 connected with another SAN 14. Further, the mapping information 231 in the self-virtualized-information management apparatus 10 is updated based on the received updated information of the mapping information 231. For this reason, the mapping information 231 which is shared with another SAN 14 can be held in a dispersed manner. Even if abnormality occurs in the virtualized-information management apparatus 10 on a certain SAN 14, the abnormality does not influence other SANs 14, and thus the virtualizing storage system having high reliability can be configured efficiently.

The embodiment of the present invention is described above, however, variously modified embodiments other than the one described can be made without departing form the scope of the technical spirit of the appended claims.

The embodiment explains the FC-SAN where the storage in each SAN transmits/receives the data according to the FC protocol, for example. The present invention is not, however, limited to this, and the invention can be applied to an IP-SAN or the like where the storage in each SAN transmits/receives data according to an Internet small computer system interface (iSCSI) protocol. Since the iSCSI protocol uses the transmission control protocol/Internet protocol (TCP/IP) for the transmission/reception of data, data can be transmitted/received via the IP network 15 without executing a protocol converting process.

In the case of the IP-SAN, data in virtual volumes can be accessed by some methods. In a first method, each virtualized-information management apparatus has an initiator function which issues an iSCSI command and a target function which executes the iSCSI command issued by the initiator function.

When the virtualized-information management apparatus accepts the request for acquiring data in the virtual volume on another SAN from the application server on the SAN, the apparatus transmits the data acquisition request to the virtualized-information management apparatus on the SAN where the virtual volume is present according to the iSCSI protocol.

The virtualized-information management apparatus which receives the data acquisition request acquires data from the real volume specified by executing the mapping process, and transmits the data to the application server via the virtualized-information management apparatus on the same SAN where the application server is present.

In the second method, the application server has the initiator function, and each virtualized-information management apparatus has the target function. When the virtualized-information management apparatus accepts the acquisition request of the data in the virtual volume on another SAN from the application server on the SAN where the apparatus is present, the apparatus transmits the information about the virtual volume where the acquired data are present to the application server.

The application server which receives the virtual volume information transmits the data acquisition request directly to the virtualized-information management apparatus on the SAN where the virtual volume is present according to the iSCSI protocol.

The virtualized-information management apparatus which receives the data acquisition request acquires data from the real volume specified by executing the mapping process, and transmits the data directly to the application server without routing through the virtualized-information management apparatus on the SAN where the application server is present.

In the third method, the application server which receives the virtual volume information from the virtualized-information management apparatus on the same SAN in the second method accesses directly to the real volume on another SAN based on the information so as to acquire the data. In this case, since the data are written without routing through a cache of the virtualized-information management apparatus, the cache data 232 should be nullified.

In the first method, the virtualized-information management apparatus on the SAN where the application server which makes the data acquisition request is present is a bottleneck, and thus the access speed is possibly reduced. Since the iSCSI interface, however, does not have to be provided to the application server, the system can be configured more inexpensively than the second and the third methods.

Meanwhile, in the second and the third methods, data are transmitted/received without routing through the virtualized-information management apparatus on the SAN where the application server is present. For this reason, the volume of communication using the iSCSI protocol between the virtualized-information management apparatuses can be suppressed, and thus the load on the IP network can be reduced.

In the embodiment, the data such as the updated information of the mapping information to be transmitted/received are encapsulated with the IP protocol so as to be tunneled through the IP network. The present invention is, however, not limited to this, and an apparatus having the similar function may be additionally provided.

FIG. 8 is a schematic diagram of a virtualizing storage system when FCIP gateways 16a and 16b execute an encapsulating process. A difference from the virtualizing storage system shown in FIG. 1 is that the FCIP gateways 16a and 16b are provided between the IP network 15 and the SANs 14a and 14b.

The FCIP gateways 16a and 16b encapsulate data of FC protocol with the IP protocol, and decapsulate the encapsulated data of the FC protocol. They can be tunneled through the IP network 15. In this case, it is not necessary that the virtualized-information management apparatuses are present between the IP network 15 and the SANs 14a and 14b.

Further, in the embodiment, the virtualized-information management apparatuses connected with the SANs, respectively, have the management function of the mapping information. The present invention, however, is not limited to this, and a domain name system (DNS) server connected with the IP network may have the management function of the mapping information.

In this case, the DNS server manages an IP address of a computer connected with the IP network, and is connected with the IP network, so as to manage the mapping information in the storage where data are transmitted/received by iSCSI.

The storage itself may have the management function of the mapping information. A switch product such as an FC switch may have the management function of the mapping information.

In the embodiment, one virtualized-information management apparatus is connected with one SAN so as to manage the SAN. The present invention, however, is not limited to this, and one virtualized-information management apparatus may manage a plurality of SANs. In this case, the mapping updating information is communicated between the virtualized-information management apparatuses, so that the virtualizing storage system having high reliability can be configured.

As to the respective processes explained in the embodiment, all or some of the processes which are executed automatically can be executed manually, or all or some of the processes which are executed manually can be executed automatically by known methods. The processing procedures, the control procedures, the concrete names, and the information including various data and parameters described in the specification and illustrated in the drawings can be arbitrarily modified unless specially noted.

The components of the respective apparatuses in the drawings are conceptualistic in the functions, and it is not always necessary to physically configure the system as illustrated in the drawings. That is to say, the concrete form of dispersion and integration of the components is not limited to those illustrated in the drawings, and thus all or some of the components can be configured by functionally or physically dispersing and integrating them in an arbitrary unit according to various loads and use conditions. All or some of the processing functions which are executed in the devices are realized by a central processing unit (CPU) and programs which are analyzed and executed by the CPU, or can be realized as a hardware using a wired logic.

The virtualized-information management method explained in the embodiment can be realized by executing a prepared program using a computer such as a personal computer or a workstation. This program can be distributed via the network such as the Internet. The program is recorded into a recording medium readable by the computer such as a hard disk, a flexible disk (FD) a compact-disc read only memory (CD-ROM), a magneto optical disk (MO), and a digital versatile disk (DVD), and the program is read from the recording medium by the computer so as to be executed.

According to the present invention, the information about the updating of the corresponding information is transmitted/received between the self-virtualized-information management apparatus and another virtualized-information management apparatus connected with other network, and the corresponding information of the self-virtualized-information management apparatus is updated based on the received information about the updating of the corresponding information. For this reason, the corresponding information which is shared with another network can be held in a dispersed manner, and even if abnormality occurs in a virtualized-information management apparatus of a certain network, the abnormality does not influence another networks. As a result, the virtualizing storage system having high reliability can be configured efficiently.

When the data storage request or the data acquisition request with respect to the virtual storage area is accepted from the virtual storage area, a virtualized-information management apparatus which is connected with the network where the virtual storage area is configured is searched. When the searched virtualized-information management apparatus is the self-virtualized-information management apparatus, the data are stored into the real storage area related with the virtual storage area based on the updated corresponding information, or data are acquired from the real storage area related with the virtual storage area. For this reason, the data storage process or the data acquisition process can be executed suitably and efficiently with reference to the updated corresponding information.

When the data acquisition request is accepted from the virtualized-information management apparatus connected with another network, data are acquired from the real storage area related with the virtual storage area based on the updated corresponding information. Further, the acquired data are transmitted to the virtualized-information management apparatus connected with another network. For this reason, the data stored in the storage on the network managed by the virtualized-information management apparatus can be provided to the virtualized-information management apparatus connected with another network efficiently.

When the searched virtualized-information management apparatus is the virtualized-information management apparatus connected with another network, the data storage request or the data acquisition request is transferred to the searched virtualized-information management apparatus. For this reason, even if the virtual storage area where the data are stored or acquired is not present on the network managed by the self-virtualized-information management apparatus, the request is given to the virtualized-information management apparatus connected with another network. As a result, the data storage or acquisition can be executed efficiently.

When the virtualized-information management apparatus connected with another network receives the transmitted data according to the data acquisition request transferred to the virtualized-information management apparatus, the apparatus stores the data. When the apparatus accepts the data acquisition request next time, it outputs the stored data. For this reason, the load due to the transmission/reception of data can be reduced.

The data stored in the first real storage area is copied into the second real storage area, and the data storage request or the data acquisition request with respect to the first real storage area is accepted. At this time, the data storage or acquisition destination is switched into the second real storage area according to the access load on the first real storage area where the data are stored. For this reason, the access load on the real storage area can be balanced.

The real storage areas are selected based on a predetermined condition, and the selected real storage areas are integrated virtually so as to configure the virtual storage area. Further, the corresponding information of the self-virtualized-information management apparatus is further updated based on the corresponding information in the configured virtual storage area. For this reason, the virtual storage area having desired properties can be configured efficiently.

When the network connected with the self-virtualized-information management apparatus is connected with another network by the IP network, the information about the updating of the corresponding information is encapsulated with the packet of the IP protocol so as to be transmitted. When the information about the updating of the corresponding information encapsulated with the packet of the IP protocol is received, the information about the updating of the corresponding information is decapsulated. For this reason, the system that can transmit/receive the information about the updating of the corresponding information can be configured inexpensively using the widely spread IP network.

When the network connected with the self-virtualized-information management apparatus is connected with another network by the IP network, data are encapsulated with the packet of the IP protocol so as to be transmitted. When the data encapsulated with the packet of the IP protocol are received, the data are decapsulated. Therefore, the system that can transmit/receive data can be configured inexpensively by using the widely spread IP network.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A virtualized-information management apparatus for managing corresponding information between real volumes of a plurality of storages connected to a network and a virtual volume built by virtually integrating the real volumes, comprising:
   a transmission/reception unit that transmits/receives, between the virtualized-information management apparatus and another virtualized-information management apparatus connected to another network, information on updating the corresponding information;
   an updating unit that updates the corresponding information based on the information received; and
   a building unit that accepts specifying of a necessary capacity of the virtual volume, selects the real volumes connected to networks based on a predetermined priority sequence of the networks until a total free capacity of the real volumes selected reaches the necessary capacity, and builds a new virtual volume by virtually integrating the real volumes selected; wherein
   the updating unit further updates the corresponding information based on corresponding information of the new virtual volume.

2. The virtualized-information management apparatus according to claim 1, further comprising:
   a searching unit that, when receiving a request for writing data into or reading data from the virtual volume, searches for a virtualized-information management apparatus connected to a network where the virtual volume is built; and
   a writing/reading unit that, when the virtualized-information management apparatus searched is the virtualized-information management apparatus itself, writes data into or reads data from the real volumes corresponding to the virtual volume based on the corresponding information updated.

3. The virtualized-information management apparatus according to claim 2, wherein
   the writing/reading unit includes
      a capsulating unit that capsulates the information on updating the corresponding information using an internet protocol packet; and
      a decapsulating unit that decapsulates capsulated information,
   when the network is connected to the another network via internet protocol network, the writing/reading unit capsulates the information about the updating of the corresponding information, and transmits the information capsulated, and
   when receiving the information capsulated, the writing/reading unit decapsulates the information capsulated.

4. The virtualized-information management apparatus according to claim 2, wherein when the writing/reading unit receives the request for reading data from the another virtualized-information management apparatus, it reads the data from the real volumes corresponding to the virtual volume based on the corresponding information updated, and transmits the data read to the another virtualized-information management apparatus.

5. The virtualized-information management apparatus according to claim 2, wherein when the virtualized-information management apparatus searched is the another virtualized-information management apparatus, the writing/reading unit transfers the request for writing data or reading data to the another virtualized-information management apparatus.

6. The virtualized-information management apparatus according to claim 5, further comprising:
   a data cache unit that, when receiving data transmitted from the another virtualized-information management apparatus in response to the request for reading data transferred, stores the data, and when receiving another request for reading the data, outputs the data stored.

7. The virtualized-information management apparatus according to claim 2, further comprising:
   a copying unit that copies data stored in one real volume into other real volume, wherein
   when receiving the request for writing or reading data stored in the one real volume, the writing/reading unit switches a data writing destination or a data reading destination to the other real volume based on an access load on the one real volume.

8. The virtualized-information management apparatus according to claim 1, wherein
   the writing/reading unit includes
      a capsulating unit that capsulates the information on updating the corresponding information using an internet protocol packet; and
      a decapsulating unit that decapsulates capsulated information,
   when the network is connected to the another network via internet protocol network, the writing/reading unit capsulates the information about the updating of the corresponding information, and transmits the information capsulated, and
   when receiving the information capsulated, the writing/reading unit decapsulates the information capsulated.

9. The virtualized-information management apparatus according to claim 1, wherein
   the transmission/reception unit includes
      a capsulating unit that capsulates the information on updating the corresponding information using an internet protocol packet; and
      a decapsulating unit that decapsulates capsulated information,
   when the network is connected to the another network via internet protocol network, the transmission/reception unit capsulates the information about the updating of the corresponding information, and transmits the information capsulated, and
   when receiving the information capsulated, the transmission/reception unit decapsulates the information capsulated.

10. The virtualized-information management apparatus according to claim 9, wherein
   the writing/reading unit includes
      a capsulating unit that capsulates the information on updating the corresponding information using an internet protocol packet; and
      a decapsulating unit that decapsulates capsulated information,
   when the network is connected to the another network via internet protocol network, the writing/reading unit capsulates the information about the updating of the corresponding information, and transmits the information capsulated, and
   when receiving the information capsulated, the writing/reading unit decapsulates the information capsulated.

11. A method of managing corresponding information between real volumes of a plurality of storages connected to a network and a virtual volume built by virtually integrating the real volumes in a virtualized-information management apparatus connected to the network, comprising:

- transmitting information on updating the corresponding information to another virtualized-information management apparatus connected to another network;
- receiving the information on updating the corresponding information from the another virtualized-information management apparatus;
- updating the corresponding information based on the information received;
- accepting specifying of a necessary capacity of the virtual volume;
- selecting the real volumes connected to networks based on a predetermined priority sequence of the networks until a total free capacity of the real volumes selected reaches the necessary capacity;
- building a new virtual volume by virtually integrating the real volumes selected; and
- updating the corresponding information based on corresponding information of the new virtual volume.

12. A computer program for managing corresponding information between real volumes of a plurality of storages connected to a network and a virtual volume built by virtually integrating the real volumes in a virtualized-information management apparatus connected to the network, making a computer execute:

- transmitting information on updating the corresponding information to another virtualized-information management apparatus connected to another network;
- receiving the information on updating the corresponding information from the another virtualized-information management apparatus;
- updating the corresponding information based on the information received;
- accepting specifying of a necessary capacity of the virtual volume;
- selecting the real volumes connected to networks based on a predetermined priority sequence of the networks until a total free capacity of the real volumes selected reaches the necessary capacity;
- building a new virtual volume by virtually integrating the real volumes selected; and
- updating the corresponding information based on corresponding information of the new virtual volume.

* * * * *

UNITED STATES PATENT AND TRADEMARK OFFICE
CERTIFICATE OF CORRECTION

PATENT NO. : 7,275,064 B2 Page 1 of 1
APPLICATION NO. : 10/781757
DATED : September 25, 2007
INVENTOR(S) : Tetsuhiro Hirao It is certified that error appears in the above-identified patent and that said Letters Patent is hereby corrected as shown below:

On the Title Page Item (57) (Abstract), Line 4, change "storage-area" to --storage area--.

Signed and Sealed this

First Day of April, 2008

JON W. DUDAS
*Director of the United States Patent and Trademark Office*